(12) United States Patent
Soh

(10) Patent No.: US 12,045,091 B2
(45) Date of Patent: Jul. 23, 2024

(54) DISPLAY DEVICE

(71) Applicant: SAMSUNG DISPLAY CO., LTD., Yongin-si (KR)

(72) Inventor: Yongkwon Soh, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 323 days.

(21) Appl. No.: 17/528,254

(22) Filed: Nov. 17, 2021

(65) Prior Publication Data
US 2022/0179456 A1 Jun. 9, 2022

(30) Foreign Application Priority Data
Dec. 9, 2020 (KR) .................. 10-2020-0171690

(51) Int. Cl.
*G06F 1/16* (2006.01)
(52) U.S. Cl.
CPC .......... *G06F 1/1643* (2013.01); *G06F 1/1652* (2013.01)
(58) Field of Classification Search
CPC ............ G06F 3/045; G06F 3/0412; G06F 1/16–1698; G06F 3/02–027; G06F 3/041; G06F 2203/0339; G06F 3/04817; G06F 3/04886; G06F 1/1626; G06F 1/1637; G06F 1/1643; G09G 2380/02; H01L 51/5253; H01L 2221/00–68395; H01L 2251/5338; H01L 27/1244; H01L 33/12; H05K 3/28–288; H05K 2203/0759; H05K 2203/1377–1394; H05K 1/0277; H05K 1/0278; H05K 3/4691–4697; H05K 2201/09009–0909; H05K 1/0271; H01H 13/00–88; H01H 2221/05; H01H 1/02; H01H 2221/004; H01H 2251/5338; H04M 1/236; H04M 1/02–0297; H04M 1/0214; H04M 1/0216; H04M 1/0268; H10K 2102/311; H10K 59/00; H10K 59/12; G09F 1/1692; G09F 9/301
USPC ...................................................... 200/510
See application file for complete search history.

(56) References Cited

U.S. PATENT DOCUMENTS

| 4,503,294 | A | * | 3/1985 | Matsumaru | .......... | H01H 13/702 |
| | | | | | | 200/512 |
| 5,984,691 | A | * | 11/1999 | Brodsky | ............... | H05K 1/118 |
| | | | | | | 439/91 |
| 2013/0033844 | A1 | * | 2/2013 | Ladouceur | .......... | H04M 1/0268 |
| | | | | | | 361/807 |
| 2016/0103544 | A1 | * | 4/2016 | Filiz | ...................... | G06F 3/0412 |
| | | | | | | 345/174 |
| 2016/0291642 | A1 | * | 10/2016 | Kwak | ................ | G06F 3/04886 |

FOREIGN PATENT DOCUMENTS

| KR | 10-2020-0045583 | 5/2020 |
| KR | 10-2020-0076820 | 6/2020 |

* cited by examiner

*Primary Examiner* — Amr A Awad
*Assistant Examiner* — Aaron Midkiff
(74) *Attorney, Agent, or Firm* — F. CHAU & ASSOCIATES, LLC

(57) ABSTRACT

A display device includes a display panel including a button area, a button assembly disposed under the button area of the display panel, and a support layer disposed between the display panel and the button assembly and including a slit portion. The slit portion may include at least one slit surrounding at least a portion of the button area.

16 Claims, 13 Drawing Sheets

DISPLAY DEVICE

CROSS-REFERENCE TO RELATED APPLICATIONS

This application claims priority under 35 U.S.C. § 119 to Korean Patent Application No. 10-2020-0171690 filed on Dec. 9, 2020 in the Korean Intellectual Property Office the disclosure of which is incorporated by reference herein in its entirety.

TECHNICAL FIELD

Embodiments of the present inventive concept relate to a display device.

DISCUSSION OF THE RELATED ART

A flexible display device, which may be formed of a flexible material, e.g., plastic may maintain a high level of display performance even when it is in a folded state. A flexible display device may be used in various electronic equipment where foldability may be a desirable characteristic, such as portable computers, electronic newspapers, smart cards, printed media, tablets, smart phones, etc.

A flexible display device may include a flexible display panel. However, the flexible display panel may be susceptible to damage from stresses caused by forces applied to the flexible display device.

SUMMARY

Embodiments of the inventive concept provide a display device that is robust against stress.

According to an embodiment of the inventive concept, a display device includes: a display panel including a button area; a button assembly disposed under the button area of the display panel; and a support layer disposed between the display panel and the button assembly and including a slit portion, the slit portion including at least one slit surrounding at least a portion of the button area.

In an embodiment, the slit portion includes a first slit at least partially surrounding a first side of the button area and a second slit spaced apart from the first slit and surrounding a second side of the button area opposite to the first side.

In an embodiment, the slit portion further includes a third slit adjacent to a third side of the button area between the first side and the second side and a fourth slit spaced apart from the third slit and adjacent to a fourth side of the button area opposite to the third side.

In an embodiment, the first slit and the second slit are disposed between the third slit and the fourth slit.

In an embodiment, the third slit and the fourth slit extend in parallel directions.

In an embodiment, the button area has a rectangular shape having at least one rounded corner. The slit portion has a rectangular shape.

In an embodiment, the display panel further includes a display area. The button area is disposed in the display area.

In an embodiment, the at least one slit surrounds a part of the button area.

In an embodiment, the display panel further includes a display area and a non-display area adjacent to the display area. The button area is disposed in the non-display area.

In an embodiment, the at least one slit surrounds an entirety of the button area.

In an embodiment, the support layer includes a metal.

In an embodiment, the button assembly includes a first button contacting the support layer, a second button spaced apart from the first button, and an elastic layer connecting the first button and the second button.

In an embodiment, the button assembly is at least one of a power button assembly and a volume button assembly.

According to an embodiment of the inventive concept, a display device includes: a display panel including a button area and a bendable area; a button assembly disposed under the button area of the display panel; and a support layer disposed between the display panel and the button assembly and including a first slit portion and a second slit portion. The first slit portion includes at least one slit surrounding at least a portion of the button area. The second slit portion is disposed under the bendable area of the display panel and includes a plurality of slits.

In an embodiment, the first slit portion includes a first slit adjacent to a first side of the button area and a second slit spaced apart from the first slit and adjacent to a third side of the button area between the first side and a second side of the button area opposite to the first side.

In an embodiment, the first slit extends in a first direction. The second slit extends in a second direction crossing the first direction.

In an embodiment, the button area is adjacent to an edge of the display panel.

In an embodiment, the plurality of slits of the second slit portion forms a lattice shape.

In an embodiment, the display panel further includes a non-bendable area adjacent to the bendable area. The button area is disposed in the non-bendable area.

According to an embodiment of the inventive concept, a display device includes: a display area; a non-display area surrounding at least a portion of the display area and including a button area including a button assembly; and a support layer comprising a slit portion including a slit, wherein a first portion of the support layer is disposed beneath the button area and a second portion of the support layer is disposed outside of and spaced apart from the first portion of the support layer, and wherein the slit surrounds at least a portion of the button area.

BRIEF DESCRIPTION OF THE DRAWINGS

The above and other features of the inventive concept will become more apparent by describing in detail embodiments thereof with reference to the accompanying drawings, in which.

Figure 1:
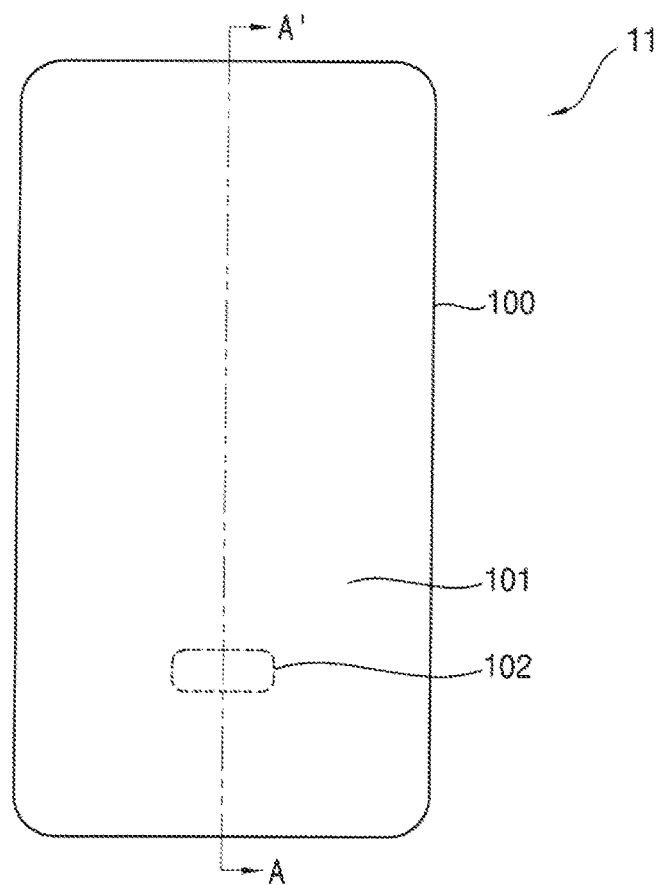
FIG. 1 is a plan view of a display device 11 according to an embodiment.

It should be noted that these figures are intended to illustrate the general characteristics of methods, structure and/or materials utilized in certain embodiments and to supplement the written description provided below. These drawings are not, however, to scale and may not precisely reflect the precise structural or performance characteristics of any given embodiment, and should not be interpreted as defining or limiting the range of values or properties encompassed by embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

Embodiments of the inventive concept will be described more fully hereinafter with reference to the accompanying drawings. Like reference numerals may refer to like elements throughout the accompanying drawings.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words use to describe the relationship between elements should be interpreted in a like fashion.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

As used herein, the singular forms "a," "an" and "the" are intended to include the plural forms as well, unless the context clearly indicates otherwise.

Embodiments of the inventive concept are described herein with reference to cross-sectional illustrations that are schematic illustrations of idealized embodiments (and intermediate structures) of embodiments. As such, variations from the shapes of the illustrations as a result, for example, of manufacturing techniques and/or tolerances, are to be expected. Thus, embodiments of the inventive concept should not be construed as limited to the particular shapes of regions illustrated herein but are to include deviations in shapes that result, for example, from manufacturing, as would be understood by a person having ordinary skill in the art.

Herein, when one value is described as being about equal to another value or being substantially the same as or equal to another value, it is to be understood that the values are equal to each other to within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art.

Hereinafter, a display device 11 according to an embodiment of the inventive concept will be described with reference to FIGS. 1 to 6.

Figure 2:
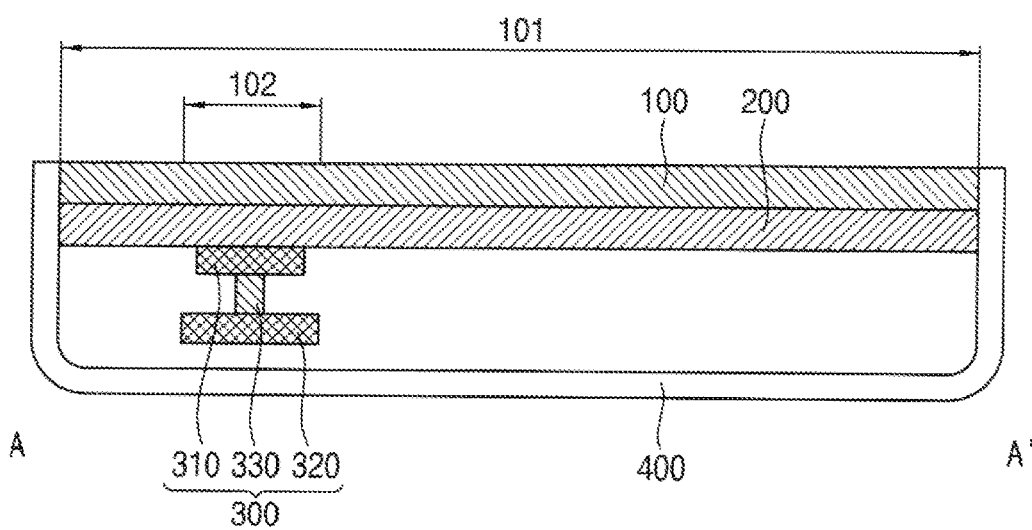
FIG. 2 is a cross-sectional view of the display device 11 taken along a line A-A' in FIG. 1.

FIG. 1 is a plan view of a display device 11 according to an embodiment. FIG. 2 is a cross-sectional view of the display device 11 taken along a line A-A' in FIG. 1.

Referring to FIGS. 1 and 2, the display device 11 may include a display panel 100, a support layer 200, a button assembly 300, and a set frame 400.

The display panel 100 may include a display area 101 and a button area 102. The display area 101 may be an area in which an image may be displayed from the display panel 100. In an embodiment, the display area 101 may be formed on the entire of a surface of the display panel 100.

The button area 102 may be disposed in the display area 101. In an embodiment, an image may be displayed in the button area 102. The button area 102 may be an area in which the button assembly 300 may be disposed. In other words, the button area 102 may at least partially overlap the button assembly 300.

In an embodiment of the inventive concept, the display panel 100 may be flexible. In an embodiment, the display panel 100 may include a flexible substrate.

Figure 3:
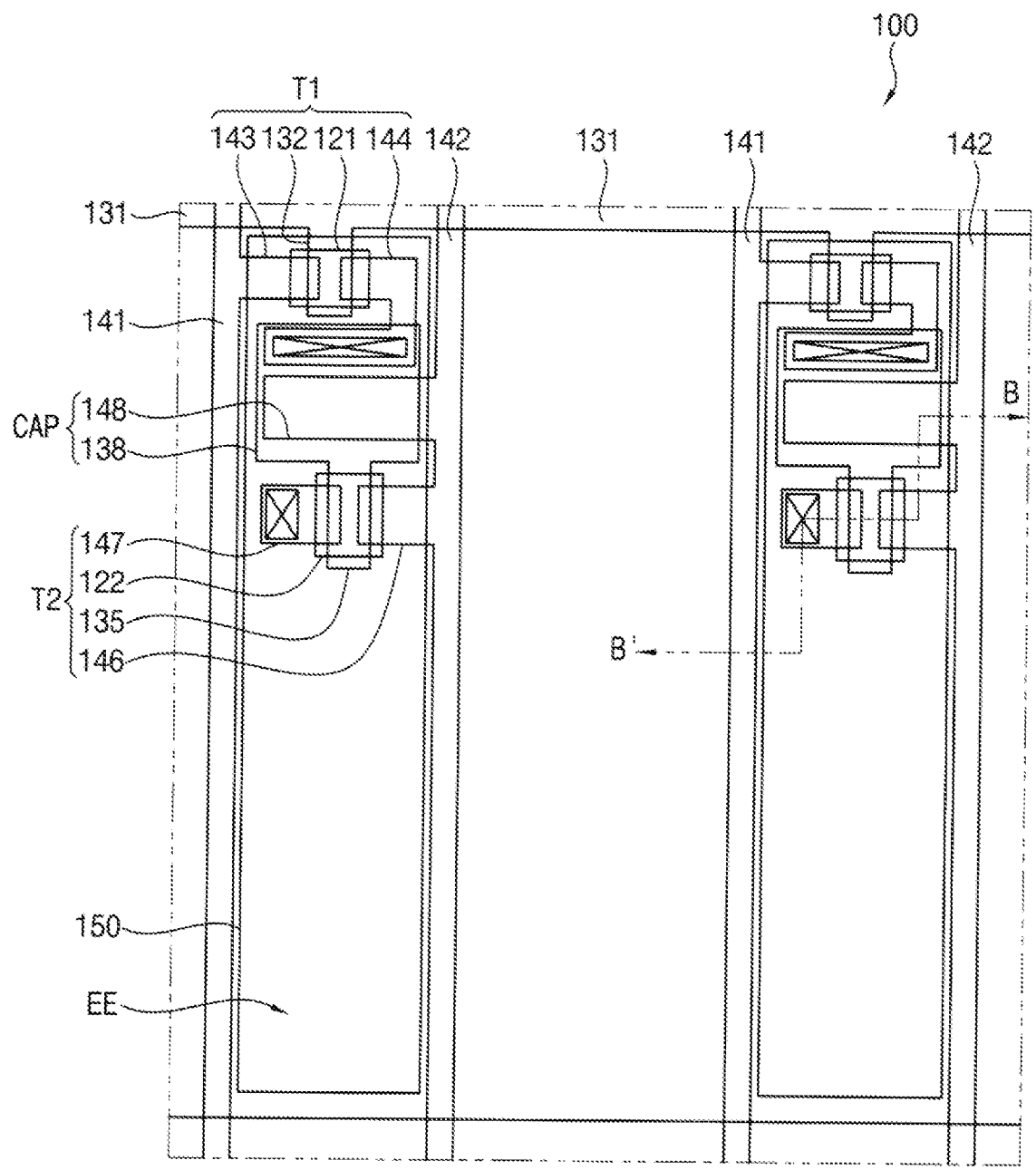
FIG. 3 is a plan view of a display panel 100 of the display device 11.
Figure 4:
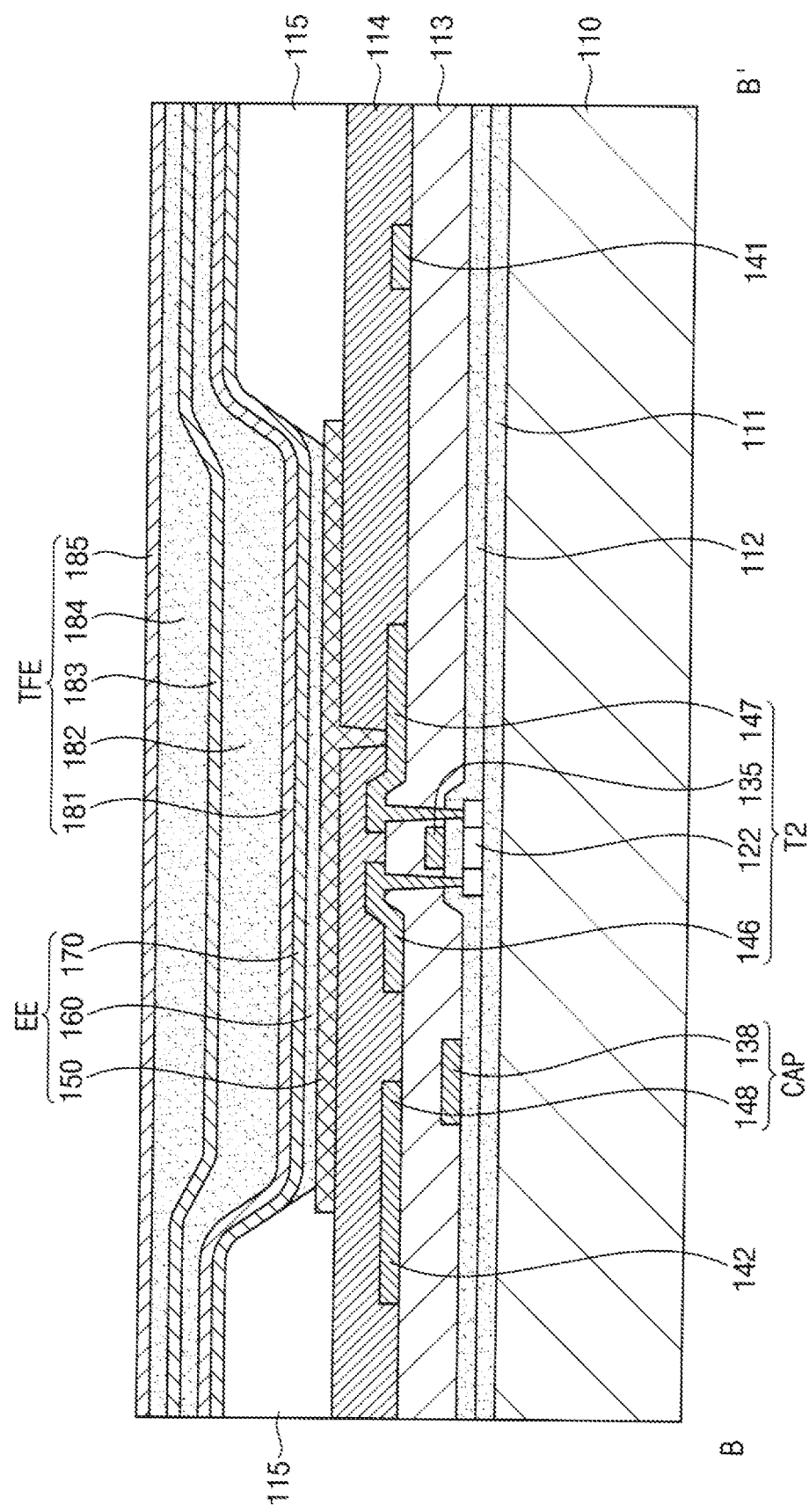
FIG. 4 is a cross-sectional view of the display panel 100 taken along a line B-B' in FIG. 3.

FIG. 3 is a plan view of the display panel 100. FIG. 4 is a cross-sectional view of the display panel 100 taken along a line B-B' in FIG. 3.

Referring to FIGS. 3 and 4, the display panel 100 may include a plurality of pixels in which each of the pixels may include a switching thin film transistor T1, a driving thin film transistor T2, a capacitor CAP, and a light emitting element EE. A pixel denotes a minimum unit for displaying an image, and the display panel 100 may display an image via at least one of the plurality of pixels.

Although FIGS. 3 and 4 illustrate that two thin film transistors and one capacitor may be disposed in one pixel, the inventive concept is not limited thereto, and one pixel may be provided with at least three thin film transistors and/or at least two capacitors, for example.

The display panel 100 may include a substrate 110, a gate line 131 disposed on the substrate 110, a data line 141 insulated from and intersecting the gate line 131, and a common power line 142. In general, one pixel may be at least partially bordered by the gate line 131, the data line 141, and the common power line 142. However, a pixel according to the inventive concept is not limited thereto. For example, the pixel may be at least partially bordered by a black matrix or a pixel defining layer.

The substrate 110 may include a flexible material such as plastic. For example, the substrate 110 may be formed of polyethersulfone (PES), polycarbonate (PC), polyimide (PI), polyethylene terephthalate (PET), polyethylene naphthalate (PEN), polyacrylate (PAR), fiber reinforced plastic (FRP), or the like.

The substrate 110 may have a thickness of about 5 μm to about 200 μm. When the substrate 110 has a thickness less than about 5 μm, it may be difficult for the substrate 110 to stably support the light emitting element EE. Further, when the substrate 110 has a thickness greater than about 200 μm, a flexibility of the substrate 110 may deteriorate.

A buffer layer 111 may be disposed on the substrate 110. The buffer layer 111 may prevent the penetration of impurities into the substrate, and may planarize a surface. The buffer layer 111 may be formed of silicon nitride, silicon oxide, silicon oxynitride, or the like. However, in an embodiment, the buffer layer 111 may be omitted according to a type of the substrate 110 and processing conditions.

A switching semiconductor layer 121 and a driving semiconductor layer 122 may be disposed on the buffer layer 111. The switching semiconductor layer 121 and the driving semiconductor layer 122 may be formed of one of polycrystalline silicon, amorphous silicon, and an oxide semiconductor such as indium gallium zinc oxide (IGZO), indium zinc tin oxide (IZTO), or the like. For example, in an embodiment, the driving semiconductor layer 122 may be formed of polycrystalline silicon, the driving semiconductor layer 122 may include a channel region that might not include impurities, and a source region and a drain region may be formed by doping impurities on opposite sides of the channel region. In an embodiment, the doped impurities may be P-type impurities including materials such as boron (B) and compounds thereof, such as $B_2H_6$. According to the inventive concept, impurities may vary depending on a type of a thin film transistor they may be included in. In an embodiment, the thin film transistor T2 may be a thin film transistor having a PMOS structure using the P-type impurities. However, the driving thin film transistor T2 is not limited thereto, and may instead have an NMOS structure or a CMOS structure, for example.

A gate insulation layer 112 may be disposed on the switching semiconductor layer 121 and the driving semiconductor layer 122. The gate insulation layer 112 may be formed of tetraethoxysilane (TEOS), silicon nitride, silicon oxide, or the like. In an embodiment, the gate insulation layer 112 may have a double-layer structure in which a silicon nitride layer having a thickness of about 40 nm and a tetraethoxysilane layer having a thickness of about 80 nm may be sequentially stacked.

A gate wiring including gate electrodes 132 and 135 may be disposed on the gate insulation layer 112. The gate wiring may further include the gate line 131, a first power storage plate 138, or the like. The gate electrodes 132 and 135 may at least partially overlap at least a portion of the semiconductor layers 121 and 122 (e.g., the channel region). In an embodiment, during the process of forming the semiconductor layers 121 and 122, impurities in the source region and the drain region of the semiconductor layers 121 and 122 may be doped, and the gate electrodes 132 and 135 may prevent impurities in the channel region from being doped.

The gate electrodes 132 and 135 and the first power storage plate 138 may be disposed on the same layer and may be formed of substantially the same metal. For example, the gate electrodes 132 and 135 and the first power storage plate 138 may be formed of molybdenum (Mo), chromium (Cr), tungsten (W), or the like.

An insulation interlayer 113 at least partially covering the gate electrodes 132 and 135 may be disposed on the gate insulation layer 112. Like the gate insulation layer 112, the insulation interlayer 113 may be formed of tetraethoxysilane, silicon nitride, silicon oxide, or the like. However, the material of the insulation interlayer 113 is not limited thereto.

Data wirings including source electrodes 143 and 146 and drain electrodes 144 and 147 may be disposed on the insulation interlayer 113. The data wirings may further include the data line 141, the common power line 142, a second power storage plate 148, or the like. The source electrodes 143 and 146 and the drain electrodes 144 and 147 may be respectively connected to the source region and the drain region of the semiconductor layers 121 and 122 through contact holes which may be formed in the gate insulation layer 112 and the insulation interlayer 113.

The switching thin film transistor T1 may include the switching semiconductor layer 121, the switching gate electrode 132, the switching source electrode 143, and the switching drain electrode 144, and the driving thin film transistor T2 may include the driving semiconductor layer 122, the driving gate electrode 135, the driving source electrode 146, and the driving drain electrode 147. Further, the capacitor CAP may include the first power storage plate 138 and the second power storage plate 148, and the insulation interlayer 113 may be disposed therebetween.

The switching thin film transistor T1 may be a switch for selecting a pixel configured to emit light. The switching gate electrode 132 may be connected to the gate line 131. The switching source electrode 143 may be connected to the data line 141. The switching drain electrode 144 may be spaced apart from the switching source electrode 143 and may be connected to the first power storage plate 138.

The driving thin film transistor T2 may provide a driving power to the pixel electrode 150 of the light emitting element EE, which may allow the emission layer 160 of the light emitting element EE to emit light. The driving gate electrode 135 may be connected to the first power storage plate 138. The driving source electrode 146 and the second power storage plate 148 may be connected to the common power line 142. The driving drain electrode 147 may be connected to the pixel electrode 150 through a contact hole.

In an embodiment, the switching thin film transistor T1 may receive a gate voltage from the gate line 131, which may allow the driving thin film transistor T2 to receive a data voltage 141 from the data line 141. A voltage corresponding to a difference between the data voltage and a common voltage provided from the common power line 142 to the driving thin film transistor T2 may be stored in the capacitor CAP, and a current corresponding to the voltage stored in the capacitor CAP may flow into the light emitting element EE through the driving thin film transistor T2, which may cause the light emitting element EE to emit light.

A planarization layer 114 may be disposed on the insulation interlayer 113 and may at least partially cover the data wirings disposed on the insulation layer 113, such as the data line 141, the common power line 142, the source electrodes 143 and 146, the drain electrodes 144 and 147, and the second power storage plate 148.

The planarization layer 114 may planarize the light emitting element EE it may be formed on, which may increase a luminance efficiency of the light emitting element EE. The planarization layer 114 may be formed of polyacrylates resin, epoxy resin, phenolic resin, polyamide-based resin, polyimide-based resin, unsaturated polyester-based resin, polyphenylene-based resin, polyphenylene sulfide-based resin, benzocyclobutene (BCB), or the like.

The pixel electrode 150 of the light emitting element EE may be disposed on the planarization layer 114. The pixel electrode 150 may be connected to the drain electrode 147 through a contact hole which may be formed in the planarization layer 114.

A pixel defining layer 115 may be disposed on the planarization layer 114 and may expose at least a portion of the pixel electrode 150 which may be referred to as a pixel region. The pixel defining layer 115 may be formed of polyacrylate-based resin, polyimide-based resin, or the like.

The emission layer 160 may be disposed on the pixel region, and a common electrode 170 may be disposed on the pixel defining layer 115 and the emission layer 160. The emission layer 160 may be formed of a low molecular organic material or a high molecular organic material. At least one of a hole injection layer (HIL) and a hole transport layer (HTL) may be disposed between the pixel electrode 150 and the emission layer 160, and at least one of an electron transport layer (ETL) and an electron injection layer (EIL) may be disposed between the emission layer 160 and the common electrode 170.

Each of the pixel electrode 150 and the common electrode 170 may be formed as any one of a transmissive electrode, a transflective electrode, and a reflective electrode.

A transmissive electrode may be formed of transparent conductive oxide (TCO). The transparent conductive oxide (TCO) may include indium tin oxide (ITO), indium zinc oxide (IZO), zinc oxide (ZnO), indium oxide ($In_2O_3$), or the like.

A transflective electrode and a reflective electrode may each be formed of a metal such as magnesium (Mg), silver (Ag), gold (Au), calcium (Ca), lithium (Li), chromium (Cr), aluminum (Al), copper (Cu), or an alloy thereof. Whether an electrode is categorized as a transflective electrode or a reflective electrode may depend on a thickness of the electrode. For example, in general, a transflective electrode may have a thickness of about 200 nm or less, while a reflective electrode may have a thickness of about 300 nm or more. As the thickness of a transflective electrode increases, its light transmittance may decrease while its resistance may increase. Further, according to the inventive concept, each of a transflective electrode and a reflective electrode may be formed in a multilayer structure including a metal layer which may be formed of metal or a metal alloy and a transparent conductive oxide layer which may be stacked on the metal layer.

A thin film encapsulation layer TFE may be disposed on the common electrode 170. The thin film encapsulation layer TFE may include at least one inorganic layer 181, 183, and 185, and at least one organic layer 182 and 184. The thin film encapsulation layer TFE may have a structure in which the inorganic layers 181, 183, and 185, and the organic layers 182 and 184 may be alternately stacked. In an embodiment, the inorganic layer 181 may be disposed at the bottom of the thin film encapsulation layer TFE. In other words, the inorganic layer 181 may be the thin film encapsulation layer TFE layer most adjacent to the light emitting element EE.

Although FIG. 4 illustrates that the thin film encapsulation layer TFE may include three inorganic layers 181, 183, and 185, and two organic layers 182 and 184, the inventive concept is not limited thereto.

The inorganic layers 181, 183, and 185 may each be formed of at least one inorganic material including $Al_2O_3$, $TiO_2$, $ZrO$, $SiO_2$, $AlON$, $AlN$, $SiON$, $Si_3N_4$, $ZnO$, and $Ta_2O_5$. The inorganic layers 181, 183, and 185 may each be formed by chemical vapor deposition (CVD) or atomic layer deposition (ALD). The inorganic layers 181, 183, and 185 may at least partially block the penetration of moisture or oxygen into the light emitting element EE.

The organic layers 182 and 184 may each be formed of a polymer-based material. The polymer-based material may include acrylate-based resin, epoxy-based resin, polyimide, polyethylene, or the like. Further, the organic layers 182 and 184 may each be formed by a thermal deposition process. The thermal deposition process for forming the organic layers 182 and 184 may be performed within a temperature range that might not damage the light emitting element EE.

The thin film encapsulation layer TFE may have a thickness of about 10 μm or less. Accordingly, the display panel 100 may be formed to be very thin. As such, the thin film encapsulation layer TFE may be disposed on the light emitting element EE so that a flexibility of the display panel 100 may be maximized.

Referring back to FIGS. 1 and 2, the button assembly 300 may be disposed under the button area 102 of the display panel 100. A user of the display device 11 may press the button assembly 300 through the display panel 100.

In the related art, a button assembly may be disposed on a side of the display device, and the button assembly may be exposed to the outside of the display device. Such exposure may compromise the reliability of a display device. In the display device 11 according to the embodiment, the button assembly 300 may be disposed under the button area 102 in the display area 101 of the display panel 100, so that the button assembly 300 may not be exposed to the outside of the display device 11. Accordingly, the reliability of the display device 11 may be improved.

In an embodiment, the button assembly 300 may be at least one of a power button assembly and a volume button assembly. For example, power and/or volume of the display device 11 may be controlled by pressing the button assembly 300 through the display pane 100. However, the inventive concept is not limited thereto. For example, in an embodiment, the button assembly 300 may control functions of the display device 11 other than or in addition to power and volume.

In an embodiment, the button assembly 300 may include a first button 310, a second button 320, and an elastic layer 330. The first button 310 may contact the support layer 200. The second button 320 may be spaced apart from the first button 310. The elastic layer 330 may connect the first button 310 and the second button 320. When the button assembly 300 is pressed through the display panel 100, the button assembly 300 may be switched as the first button 310 and the second button 320 become closer with the elastic layer 330 interposed therebetween. In this case, the button assembly 300 may be a mechanical or physical button.

The support layer 200 may be disposed between the display panel 100 and the button assembly 300. The support layer 200 may protect a lower part of the display panel 100. For example, a flexible display panel of a display device might be damaged by an external impact to the display device. According to the inventive concept, as the support layer 200 is disposed under the display panel 100, the support layer 200 may protect a lower part of the display panel 100 from an external impact to the display device 11.

The support layer 200 may include a material having relatively high hardness. For example, a hardness of the support layer 200 may be greater than a hardness of the display panel 100. In an embodiment, the support layer 200 may include a metal such as stainless steel, copper (Cu), graphite, or the like.

Figure 5:
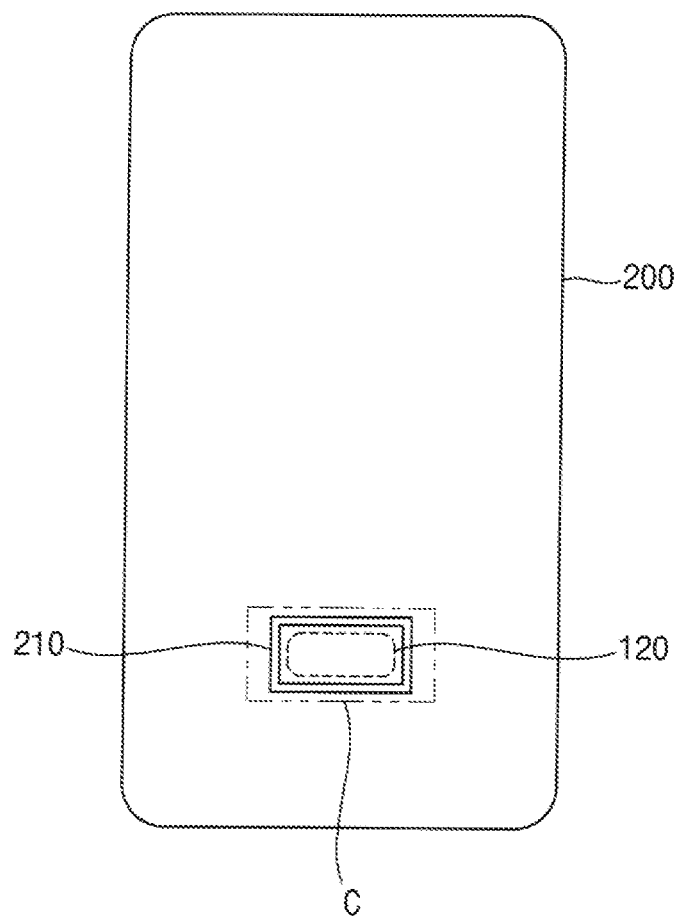
FIG. 5 is a plan view of a support layer 200 of the display device 11.
Figure 6:
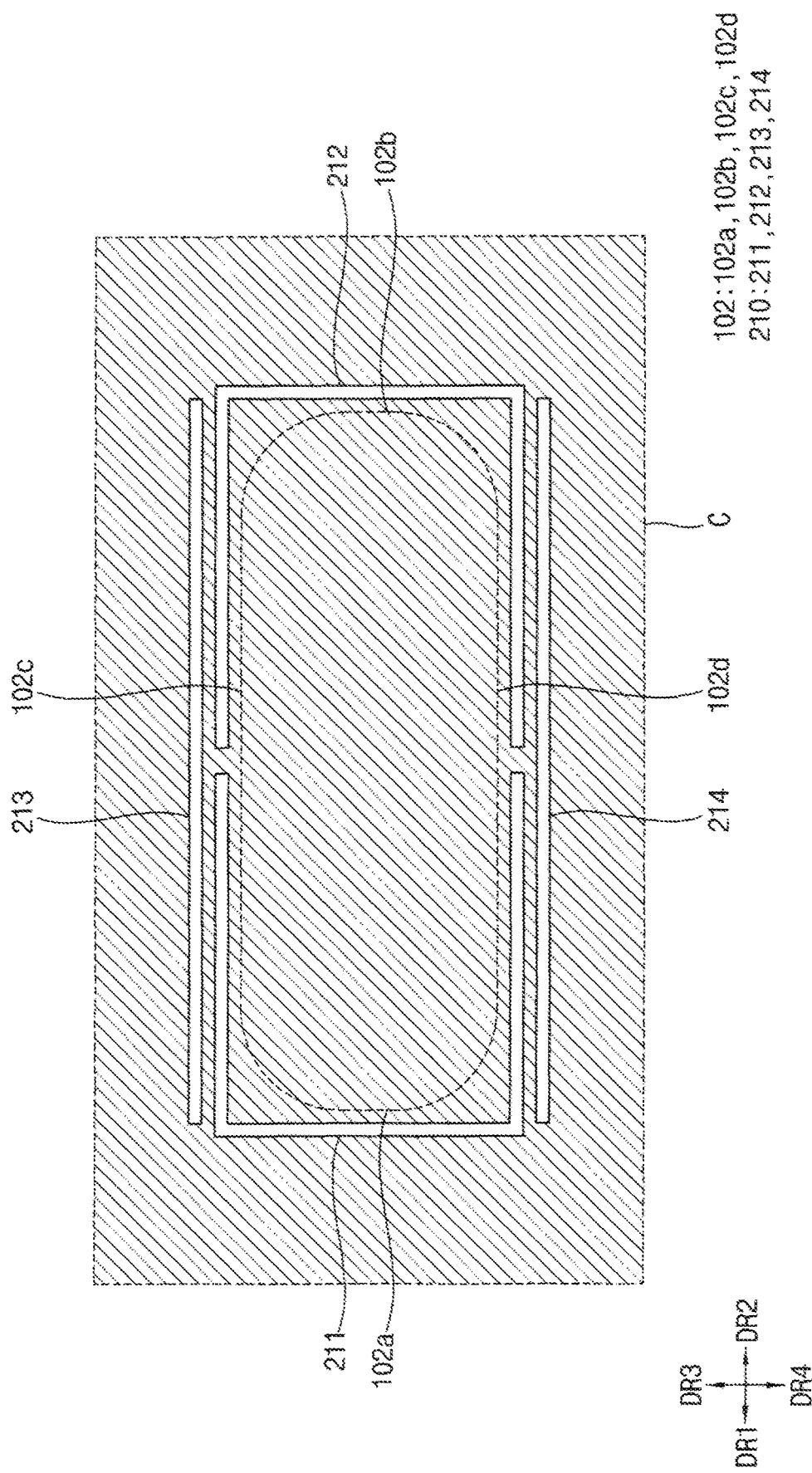
FIG. 6 is a plan view of an area C in FIG. 5.

FIG. 5 is a plan view of the support layer 200 of the display device 11. FIG. 6 is a plan view of an area C in FIG. 5.

Referring to FIGS. 5 and 6, the support layer 200 may include a slit portion 210. The slit portion 210 may include at least one slit surrounding at least a portion of the button area 102. The at least one slit may pass through the support layer 200 in a direction perpendicular to the surface of the display panel 100. In an embodiment, the button area 102 may have a rectangular shape having rounded corners, and the slit portion 210 may have a rectangular frame shape surrounding the button area 102. The slit portion 210 may prevent damage to the support layer 200 that might be caused by external force applied to the support layer 200. For example, the slit portion 210 may deform when the button assembly 300 is pressed through the display panel 100, absorbing stress that might otherwise be provided to the support layer 200.

In embodiments, the slit portion 210 may include a plurality of slits. In an embodiment, the slit portion 210 may include a first slit 211, a second slit 212, a third slit 213, and a fourth slit 214. The first slit 211 may at least partially surround a first side 102*a* of the button area 102. The first side 102*a* of the button area 102 may be positioned in a first direction DR1 from a center of the button area 102. The first slit 211 may have a rectangular shape in which a side opposite to the first side 102*a* of the button area 102 may be omitted.

The second slit 212 may be spaced apart from the first slit 211, and may at least partially surround a second side 102*b* of the button area 102 in a plan view. The second side 102*b* of the button area 102 may be positioned in the second direction DR2 opposite to the first direction DR1. In other words, the second side 102*b* of the button area 102 may be opposite to the first side 102*a* of the button area 102. The second slit 212 may have a rectangular shape in which a side opposite to the second side 102*b* of the button area 102 may be omitted.

The third slit 213 may be adjacent to a third side 102*c* of the button area 102. The third side 102*c* of the button area 102 may be positioned in a third direction DR3 crossing the first direction DR1 from the center of the button area 102. In other words, the third side 102*c* of the button area 102 may be positioned between the first side 102*a* and the second side 102*b* of the button area 102. The third slit 213 may have a straight line shape extending in one direction.

The fourth slit 214 may be spaced apart from the third slit 213, and may be adjacent to a fourth side 102*d* of the button area 102. The fourth side 102*d* of the button area 102 may be positioned in a fourth direction DR4 opposite to the third direction DR3 from the center of the button area 102. In other words, the fourth side 102*d* of the button area 102 may be opposite to the third side 102*c* of the button area 102. The fourth slit 214 may have a straight line shape extending in one direction.

In an embodiment, the first slit 211 and the second slit 212 may be disposed between the third slit 213 and the fourth slit 214. In an embodiment, a distance from the button area 102 to each of the first slit 211 and the second slit 212 may be less than a distance from the button area 102 to each of the third slit 213 and the fourth slit 214.

In an embodiment, the third slit 213 and the fourth slit 214 may extend in parallel with each other. For example, the third slit 213 and the fourth slit 214 may extend parallel to the third side 102*c* and the fourth side 102*d* of the button area 102, respectively.

In an embodiment, the at least one slit of the slit portion 210 may at least partially surround a portion of the button area 102. In an embodiment, each of the first slit 211, the second slit 212, the third slit 213, and the fourth slit 214 may at least partially surround a portion of the button area 102. In an embodiment, a portion of the support layer 200 positioned inside the button area 102 and a portion of the support layer 200 positioned outside the button area 102 may be connected to each other.

Referring back to FIGS. 1 and 2, the set frame 400 may accommodate the display panel 100, the support layer 200, the button assembly 300, or the like. The set frame 400 may at least partially surround a lower portion and a side portion of the display panel 100, and may form an outer shape of the display device 11. The set frame 400 may be formed of a metal having high rigidity, for example, magnesium (Mg), magnesium alloy, aluminum (Al), aluminum alloy, stainless steel, or the like.

Hereinafter, a display device 12 according to an embodiment will be described with reference to FIGS. 7 to 9. Descriptions of elements of the display device 12 which are substantially the same as or similar to those of the display device 11 will be omitted.

Figure 7:
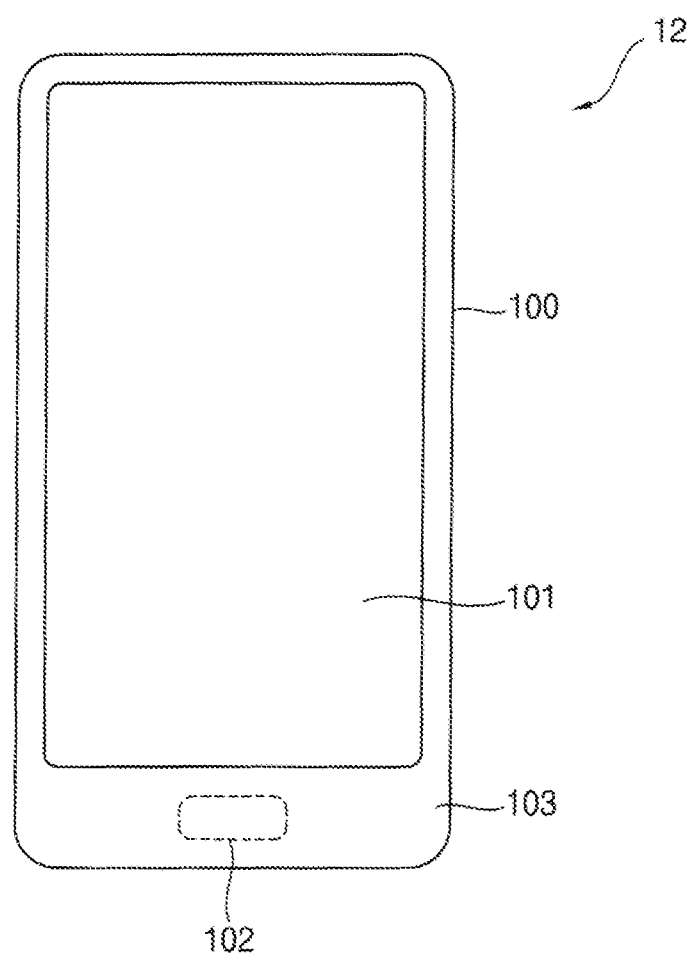
FIG. 7 is a plan view of a display device 12 according to an embodiment.

FIG. 7 is a plan view of a display device 12 according to an embodiment.

Referring to FIG. 7, the display panel 100 may include a display area 101, a non-display area 103, and a button area 102. The non-display area 103 may be an area in which an image might not be displayed from the display panel 100. A black matrix may be formed in the non-display area 103. The non-display area 103 may be adjacent to the display area 101. In an embodiment, the non-display area 103 may surround at least a portion of the display area 101.

The button area 102 may be disposed in the non-display area 103. In this case, an image might not be displayed in the button area 102.

Figure 8:
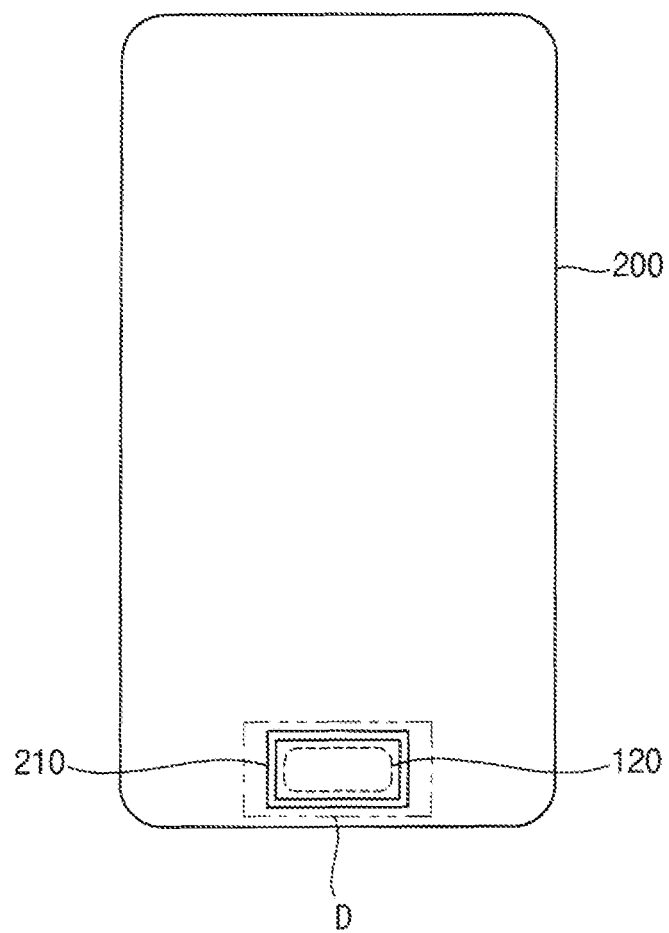
FIG. 8 is a plan view of a support layer of the display device 12.

FIG. 8 is a plan view of a support layer 200 of the display device 12. FIG. 9 is a plan view of an area D in FIG. 8.

Figure 9:
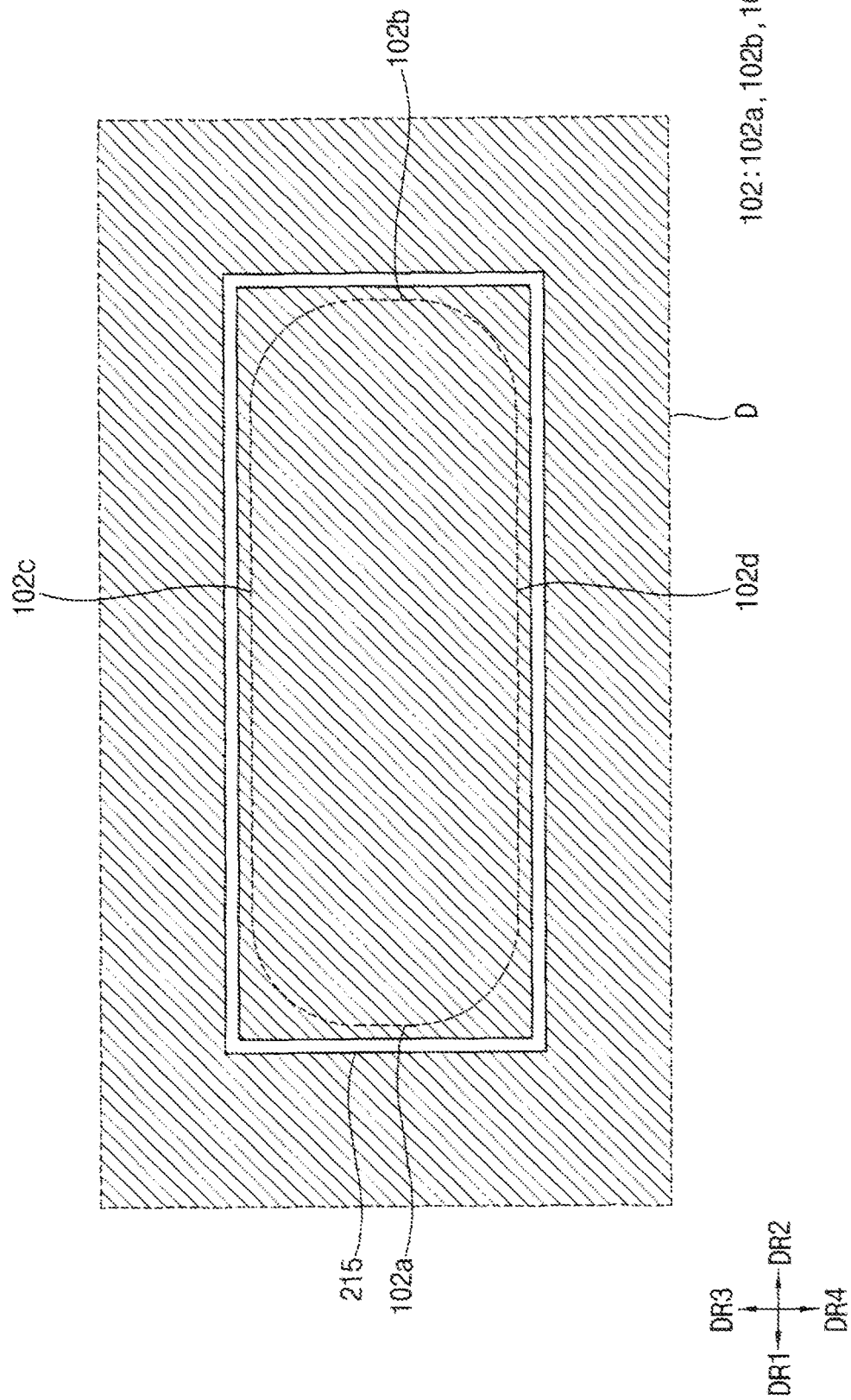
FIG. 9 is a plan view of an area D in FIG. 8.

Referring to FIGS. 8 and 9, the support layer 200 may include a slit portion 210. The slit portion 210 may include at least one slit surrounding at least a part of the button area 102. The at least one slit may pass through the support layer 200 in a direction perpendicular to a surface of the display panel 100.

In an embodiment, the slit portion 210 may include one slit 215. The slit 215 may surround an entirety of the button area 102. In an embodiment, a first portion of the support layer 200 positioned inside the button area 102 and a second portion of the support layer 200 positioned outside the button area 102 may be spaced apart from each other. For example, while the first portion of the support layer 200 may be pressed through the display panel 100, the second portion of the support layer 200 might not deform.

In an embodiment, the slit 215 may have a rectangular shape.

Hereinafter, a display device 13 according to an embodiment will be described with reference to FIGS. 10 to 15. Descriptions of elements of the display device 13 which are substantially the same as or similar to those of the display device 11 will be omitted.

Figure 10:
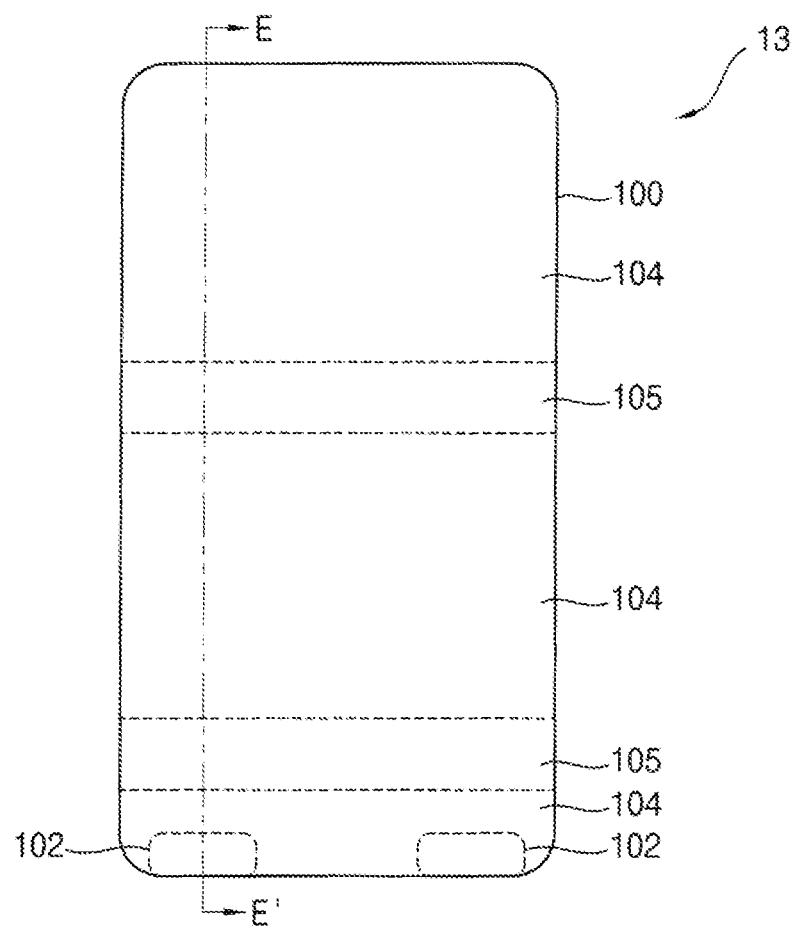
FIG. 10 is a plan view of a display device 13 according to an embodiment.
Figure 11:
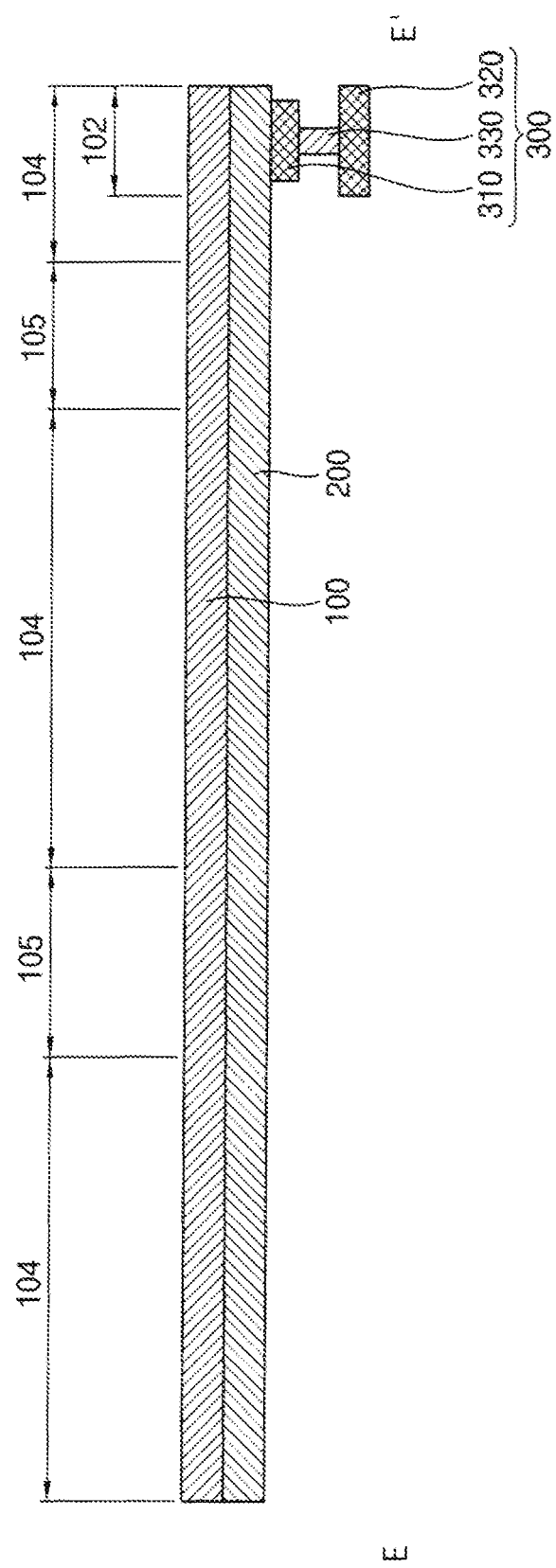
FIG. 11 is a cross-sectional view of the display device 13 taken along a line E-E' in FIG. 10.

FIG. 10 is a plan view of a display device 13 according to an embodiment. FIG. 11 is a cross-sectional view of the display device 13 taken along a line E-E' in FIG. 10.

Referring to FIGS. 10 and 11, the display device 13 may include a display panel 100, a support layer 200, a button assembly 300, and a set frame.

The display panel 100 may include a non-bendable area 104, a bendable area 105, and a button area 102. The non-bendable area 104 may be an area in which the display panel 100 might not bent. In an embodiment, the display panel 100 may include a plurality of non-bendable areas 104 spaced apart from each other.

The bendable area 105 may be adjacent to the non-bendable area 104. The bendable area 105 may be an area in which the display panel 100 may be bent. In an embodiment, the display panel 100 may include a plurality of bendable areas 105 respectively disposed between the non-bendable areas 104.

The button area 102 may be disposed in the non-bendable area 104. The button area 102 may be an area in which the button assembly 300 is disposed. In an embodiment, the button area 102 may be adjacent to an edge of the display panel 100.

The button assembly 300 may be disposed under the button area 102 of the display panel 100. The support layer 200 may be disposed between the display panel 100 and the button assembly 300.

Figure 12:
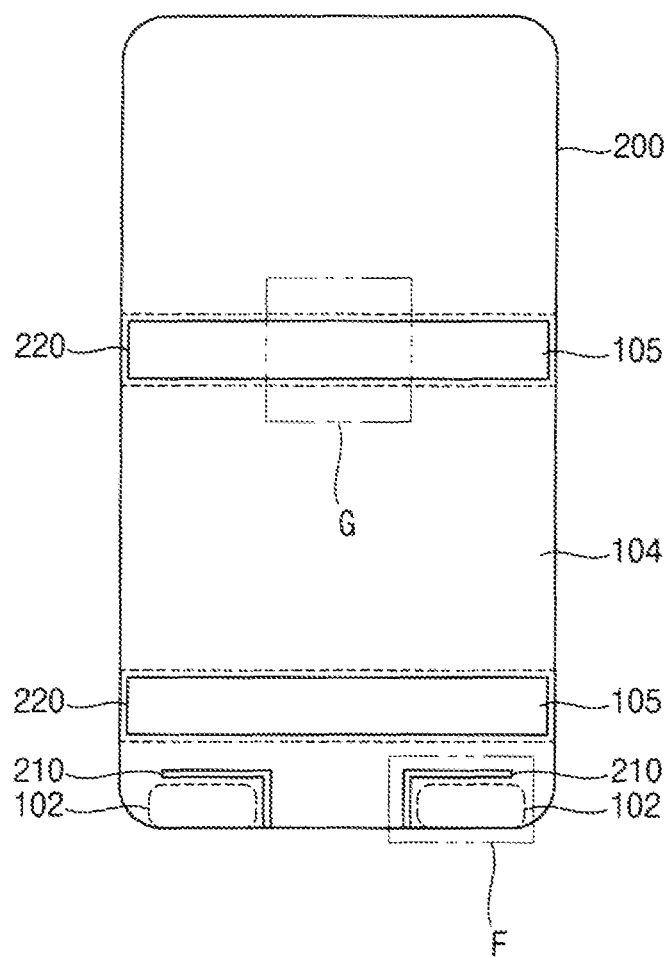
FIG. 12 is a plan view of a support layer 200 of the display device 13.
Figure 13:
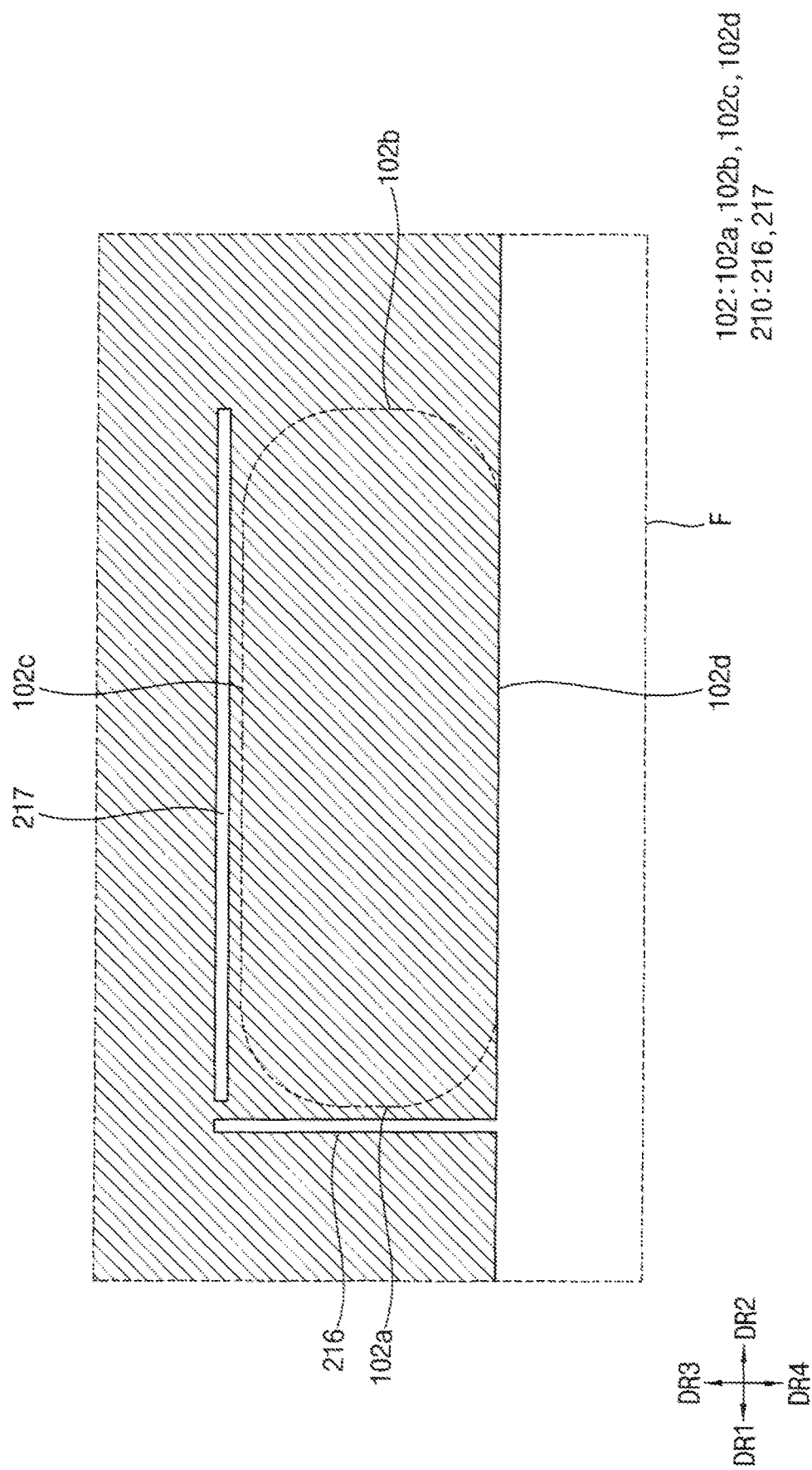
FIG. 13 is a plan view of an area F in FIG. 12.
Figure 14:
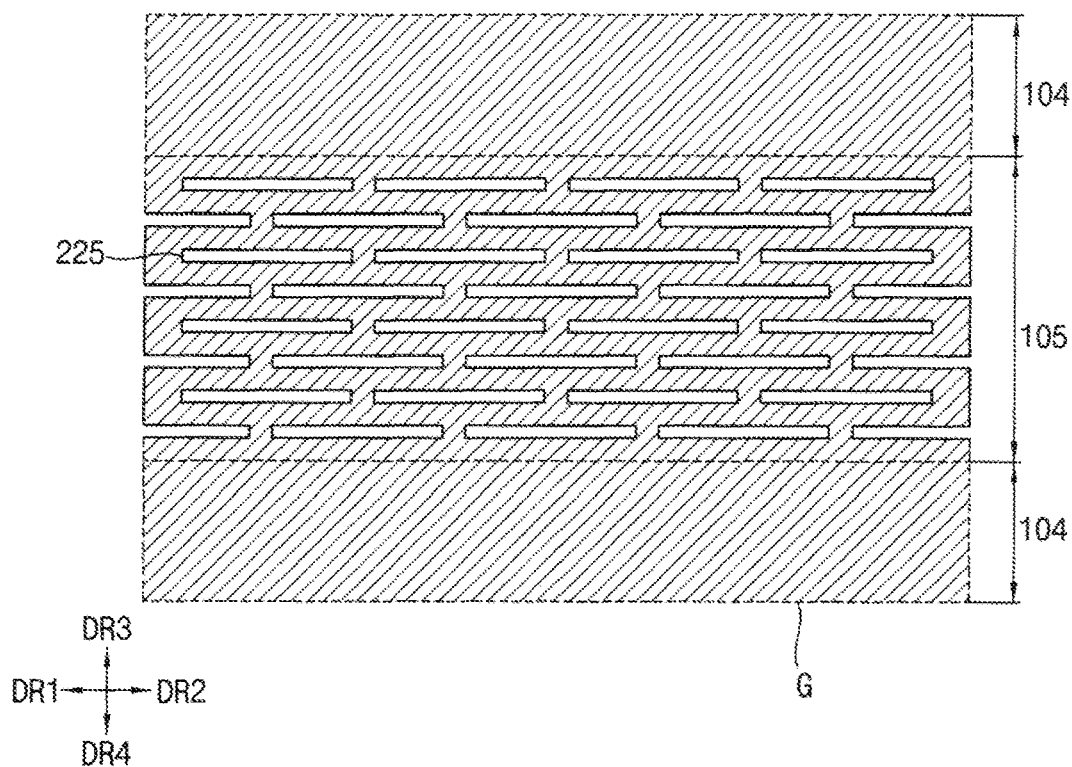
FIG. 14 is a plan view of an area G in FIG. 12.

FIG. 12 is a plan view of the support layer 200 of the display device 13. FIG. 13 is a plan view of an area F in FIG. 12. FIG. 14 is a plan view of an area G in FIG. 12.

Referring to FIGS. 12, 13, and 14, the support layer 200 may include a first slit portion 210 and a second slit portion 220. The first slit portion 210 may include at least one slit surrounding at least a portion of the button area 102. The at least one slit may pass through the support layer 200 in a direction perpendicular to a surface of the display panel 100.

In embodiments, the first slit portion 210 may include a plurality of slits. In an embodiment, the first slit portion 210 may include a first slit 216 and a second slit 217. The first slit 216 may be adjacent to a first side 102a of the button area 102. The first slit 216 may have a straight line shape extending in one direction.

The second slit 217 may be spaced apart from the first slit 216, and may be adjacent to a third side 102c of the button area 102. The second slit 217 may have a straight line shape extending in one direction.

In an embodiment, the first slit 216 and the second slit 217 may extend in a direction, and the second slit 217 may extend in a direction crossing the direction in which the first slit 216 extends. For example, the first slit 216 may extend in the third direction DR3 and the fourth direction DR4, and the second slit 217 may extend in the first direction DR1 and the second direction DR2.

In an embodiment, the at least one slit of the first slit portion 210 may surround a portion of the button area 102. Each of the first slit 216 and the second slit 217 may at least partially surround a portion of the button area 102 in a plan view. In such an embodiment, a portion of the support layer 200 positioned inside the button area 102 and a portion of the support layer 200 positioned outside the button area 102 may be connected to each other.

The second slit portion 220 may be disposed under the bendable area 105 of the display panel 100. The second slit portion 220 may include a plurality of slits 225. Each of the plurality of slits 225 may pass through the support layer 200 in the direction perpendicular to a surface of the display panel 100.

The plurality of slits 225 may form a lattice shape. In an embodiment, the second slit portion 220 may include a plurality of slit rows, each including a group of slits from among the plurality of slits 225 arranged along the first direction DR1, and the slit rows may be alternately arranged along the third direction DR3.

As the support layer 200 may include the second slit portion 220 disposed under the bendable area 105 of the display panel 100, the plurality of slits 225 of the second slit portion 220 may be deformed when the bendable area 105 of the display panel 100 is bent. Accordingly, damage to the support layer 200 due to stress caused by bending of the bendable area 105 of the display panel 100 may be prevented.

Figure 15:
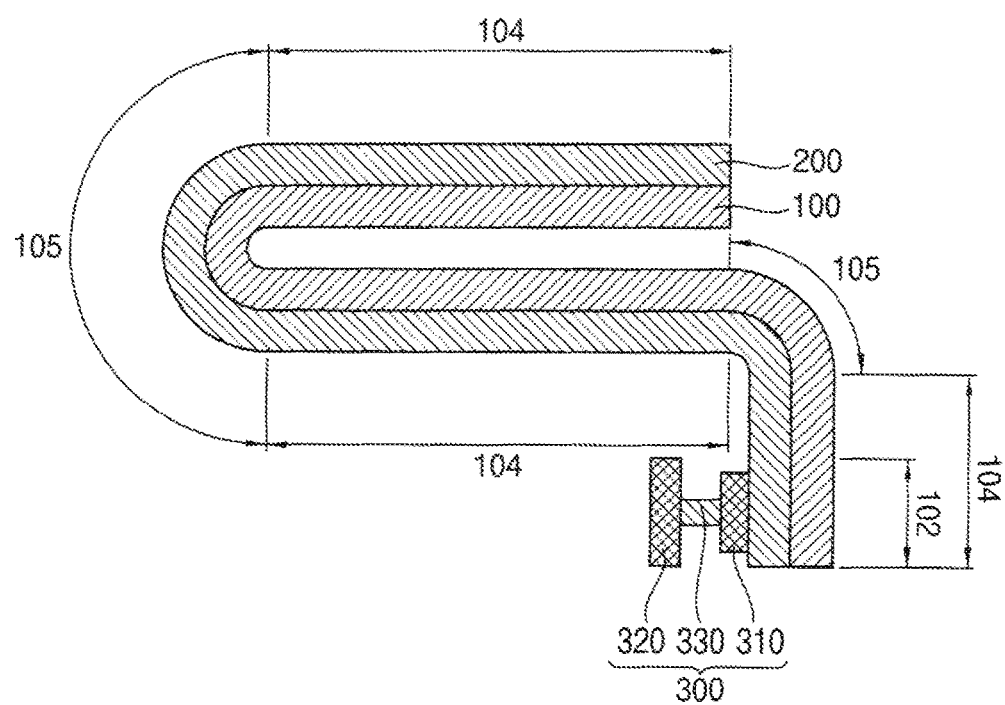
FIG. 15 is a cross-sectional view of the display device 13 in a folded state.

FIG. 15 is a cross-sectional view of the display device 13 in in a folded state.

Referring to FIG. 15, in an embodiment, the display device 13 may be folded around the bendable area 105. For example, the bendable area 105 may be bent such that non-bendable areas 104, which may be disposed with the bendable area 105 interposed therebetween, may form a predetermined angle.

A display device according to embodiments of the inventive concept may be included in electronic devices such as a computer, a notebook, a mobile phone, a smartphone, a smart pad, a PMP, a PDA, an MP3 player, or the like.

While the inventive concept has been shown and described with reference to embodiments, it will be understood by a person having ordinary skill in the art that variations in form and detail may be made within without departing from the spirit and scope of the inventive concept as defined by the following claims.

What is claimed is:
1. A display device, comprising:
a display panel including a pixel and a button area, the button area including:
a first side extending in a first direction,
a second side extending parallel to and spaced apart from the first side,
a third side extending in a second direction perpendicular to the first direction and connecting the first side to the second side, and
a fourth side extending parallel to and spaced apart from the third side and connecting the first side and the second side;
a button assembly disposed under the button area; and
a support layer disposed between the display panel and the button assembly and including a slit portion, the slit portion including:

a first slit spaced apart from the button area and including a first portion extending parallel to the first side, a second portion extending parallel to the third side, and a third portion extending parallel to the fourth side, wherein the first portion contacts the second portion and the third portion, and a second slit spaced apart from the button area and the first slit and including a fourth portion extending parallel to the second side, a fifth portion extending parallel to the third side, and a sixth portion extending parallel to the fourth side, wherein the fourth portion contacts the fifth portion and the sixth portion, and wherein the button area is disposed between the first slit and the second slit.

2. The display device of claim 1, wherein:
the second slit is spaced apart from the first slit.

3. The display device of claim 1, wherein the slit portion further includes:
a third slit adjacent to the third side of the button area; and
a fourth slit spaced apart from the third slit and adjacent to the fourth side of the button area,
wherein the button area is disposed between the third slit and the fourth slit.

4. The display device of claim 3, wherein the first slit and the second slit are disposed between the third slit and the fourth slit.

5. The display device of claim 3, wherein the third slit and the fourth slit extend in parallel directions.

6. The display device of claim 1, wherein the button area has a rectangular shape having at least one rounded corner, and
wherein the slit portion has a rectangular shape.

7. The display device of claim 1, wherein the display panel further includes a display area including the pixel, and
wherein the button area is disposed in the display area.

8. The display device of claim 1, wherein at least one of the first slit and the second slit includes a rectangular shape.

9. The display device of claim 1, wherein the support layer includes a metal.

10. The display device of claim 1, wherein the button assembly includes:
a first button contacting the support layer;
a second button spaced apart from the first button; and
an elastic layer connecting the first button and the second button.

11. The display device of claim 1, wherein the button assembly is at least one of a power button assembly and a volume button assembly.

12. A display device, comprising:
a display panel including a pixel, a bendable area, and a button area, the button area including:
a first side extending in a first direction,
a second side extending parallel to and spaced apart from the first side,
a third side extending in a second direction perpendicular to the first direction and connecting the first side to the second side, and
a fourth side extending parallel to and spaced apart from the third side and connecting the first side and the second side;
a button assembly disposed under the button area of the display panel; and
a support layer disposed between the display panel and the button assembly and including a first slit portion and a second slit portion,
wherein the first slit portion includes:
a first rectangular slit spaced apart from the button area and extending parallel to the first side; and
a second rectangular slit spaced apart from the first slit and the button area and extending parallel to the third side, and
wherein the second slit portion is disposed under the bendable area and includes a plurality of slits.

13. The display device of claim 12, wherein the fourth side contacts an edge of the display panel.

14. The display device of claim 12, wherein the plurality of slits includes a plurality of rows of rectangular slits.

15. The display device of claim 12, wherein the display panel further includes a non-bendable area adjacent to the bendable area, and
wherein the button area is disposed in the non-bendable area.

16. A display device, comprising:
a display panel including a display area and a non-display area, the display area including a pixel, the non-display area surrounding at least a portion of the display area and including a button area, the button area including:
a first side extending in a first direction,
a second side extending parallel to and spaced apart from the first side,
a third side extending in a second direction perpendicular to the first direction and connecting the first side to the second side, and
a fourth side extending parallel to and spaced apart from the third side and connecting the first side and the second side;
a button assembly disposed under the button area; and
a support layer disposed between the display panel and the button assembly, the support layer comprising a slit portion including a slit, the slit spaced apart from the button area and including a first portion extending parallel to the first side, a second portion connected to the first portion and extending parallel to the second side, a third portion connected to the second portion and extending parallel to the third side, and a fourth portion connected to the third portion and to the first portion and extending parallel to the fourth side.

* * * * *